US012297576B2

(12) United States Patent
Chung et al.

(10) Patent No.: US 12,297,576 B2
(45) Date of Patent: May 13, 2025

(54) METHODS FOR FACILITATING THE RETURN OF LOST ARTICLES WITHIN A LAUNDRY APPLIANCE

(71) Applicant: Haier US Appliance Solutions, Inc., Wilmington, DE (US)

(72) Inventors: Myunggeon Chung, Seoul (KR); Jongdeok Jang, Seoul (KR); Jee Eun Oh, Seoul (KR)

(73) Assignee: Haier US Appliance Solutions, Inc., Wilmington, DE (US)

(*) Notice: Subject to any disclaimer, the term of this patent is extended or adjusted under 35 U.S.C. 154(b) by 383 days.

(21) Appl. No.: 17/729,130

(22) Filed: Apr. 26, 2022

(65) Prior Publication Data
US 2023/0340712 A1    Oct. 26, 2023

(51) Int. Cl.
*D06F 34/18* (2020.01)
*D06F 34/08* (2020.01)
D06F 103/06 (2020.01)
D06F 105/58 (2020.01)
H04L 67/50 (2022.01)

(52) U.S. Cl.
CPC .............. *D06F 34/18* (2020.02); *D06F 34/08* (2020.02); *D06F 2103/06* (2020.02); *D06F 2105/58* (2020.02); *H04L 67/535* (2022.05)

(58) Field of Classification Search
CPC ......... D06F 34/18; D06F 34/08; H04L 67/535
See application file for complete search history.

(56) References Cited

U.S. PATENT DOCUMENTS

| 10,311,704 B1* | 6/2019 | Xu ...................... G06F 16/955 |
| 11,098,430 B2 | 8/2021 | Belveal et al. |
| 2019/0281141 A1* | 9/2019 | Daub ...................... H04L 67/01 |
| 2019/0384991 A1 | 12/2019 | Lee et al. |
| 2021/0004415 A1* | 1/2021 | McLaughlin ..... G06F 16/90335 |
| 2021/0108351 A1* | 4/2021 | Patterson ................ D06F 33/30 |
| 2022/0270378 A1* | 8/2022 | Kondo .................... G06V 20/59 |
| 2022/0316124 A1* | 10/2022 | Yi .............................. G06T 7/11 |

FOREIGN PATENT DOCUMENTS

| CN | 101964098 A | 2/2011 | |
| CN | 108053574 A | 5/2018 | |
| CN | 105763652 B | 5/2019 | |
| CN | 110241553 A | 9/2019 | |
| JP | 2010154218 A | * 7/2010 | ........... G06F 21/608 |
| JP | 2021107998 A | 7/2021 | |
| JP | 7561531 B2 | * 10/2024 | |
| KR | 20060120933 A | 11/2006 | |
| KR | 20200032481 A | 3/2020 | |
| TW | M512037 U | 11/2015 | |
| WO | WO2014198608 A1 | 12/2014 | |

OTHER PUBLICATIONS

Machine translation of JP-2010154218-A, dated Jul. 8, 2010. (Year: 2010).*

* cited by examiner

*Primary Examiner* — Joseph L. Perrin
*Assistant Examiner* — Kevin G Lee
(74) *Attorney, Agent, or Firm* — Dority & Manning, P.A.

(57) ABSTRACT

A method may include receiving a two-dimensional image of a laundry chamber and identifying a laundry article based on the received two-dimensional image. The method may further include selecting a prior-user profile corresponding to the laundry appliance in response to identifying the laundry article and directing a found-article message to the prior-user profile following selecting the prior-user profile.

20 Claims, 5 Drawing Sheets

METHODS FOR FACILITATING THE RETURN OF LOST ARTICLES WITHIN A LAUNDRY APPLIANCE

FIELD OF THE INVENTION

The present subject matter relates generally to laundry appliances, and more particularly, to methods to help find and return lost clothing articles in commercial laundry appliances.

BACKGROUND OF THE INVENTION

Laundry appliances generally include washing machine appliances and dryer appliances. Some laundry appliances are publicly available, such as commercial laundry appliances available for rent or temporary use. For example, such multiple laundry appliances may be installed in a laundromat, dormitory, or apartment building, etc. As a result, such laundry appliances will often be used by multiple people throughout a single day, most of whom do not know each other.

Although users typically try to remove all of their laundered clothing articles from a particular appliance (e.g., after such articles have been washed or dried), it is common for users to inadvertently leave one or more articles behind. In some cases, the user may not even realize an article has been left behind or is otherwise missing until he or she has left the laundromat, dormitory, or apartment building in which the laundry appliance is installed. Even if the article is discovered by a subsequent user, it may be difficult to for that subsequent to determine who prior user was or even how to contact such a person. Although a list of users may be informally maintained (e.g., by a sign-in page), ensuring an accurate record is maintained may be difficult. Moreover, maintaining such a list may give rise to security or logistical concerns with coordinating communication between users that might not otherwise know each other.

As a result, it would be useful to provide an appliance or method that can help facilitate the discovery or return of clothing articles that are inadvertently left in a laundry appliance, or otherwise lost. In particular, it may be advantageous to facilitate the identification or notification of lost articles in a laundry with users who may have lost the articles in a safe and efficient manner.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of operating a laundry appliance is provided. The method may include receiving a two-dimensional image of a laundry chamber and identifying a laundry article based on the received two-dimensional image. The method may further include selecting a prior-user profile corresponding to the laundry appliance in response to identifying the laundry article and directing a found-article message to the prior-user profile following selecting the prior-user profile.

In another exemplary aspect of the present disclosure, a method of operating a laundry appliance is provided. The method may include receiving a two-dimensional image of the laundry chamber. Receiving the two-dimensional image may be initiated by a contemporary user of the laundry appliance. The contemporary user may have a contemporary user profile. The method may further include identifying a laundry article based on the received two-dimensional image and modifying the two-dimensional image such that the identified laundry article is obscured within the two-dimensional image. The method may further include selecting a prior-user profile corresponding to the laundry appliance in response to identifying the laundry article and directing a found-article message with the modified two-dimensional.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
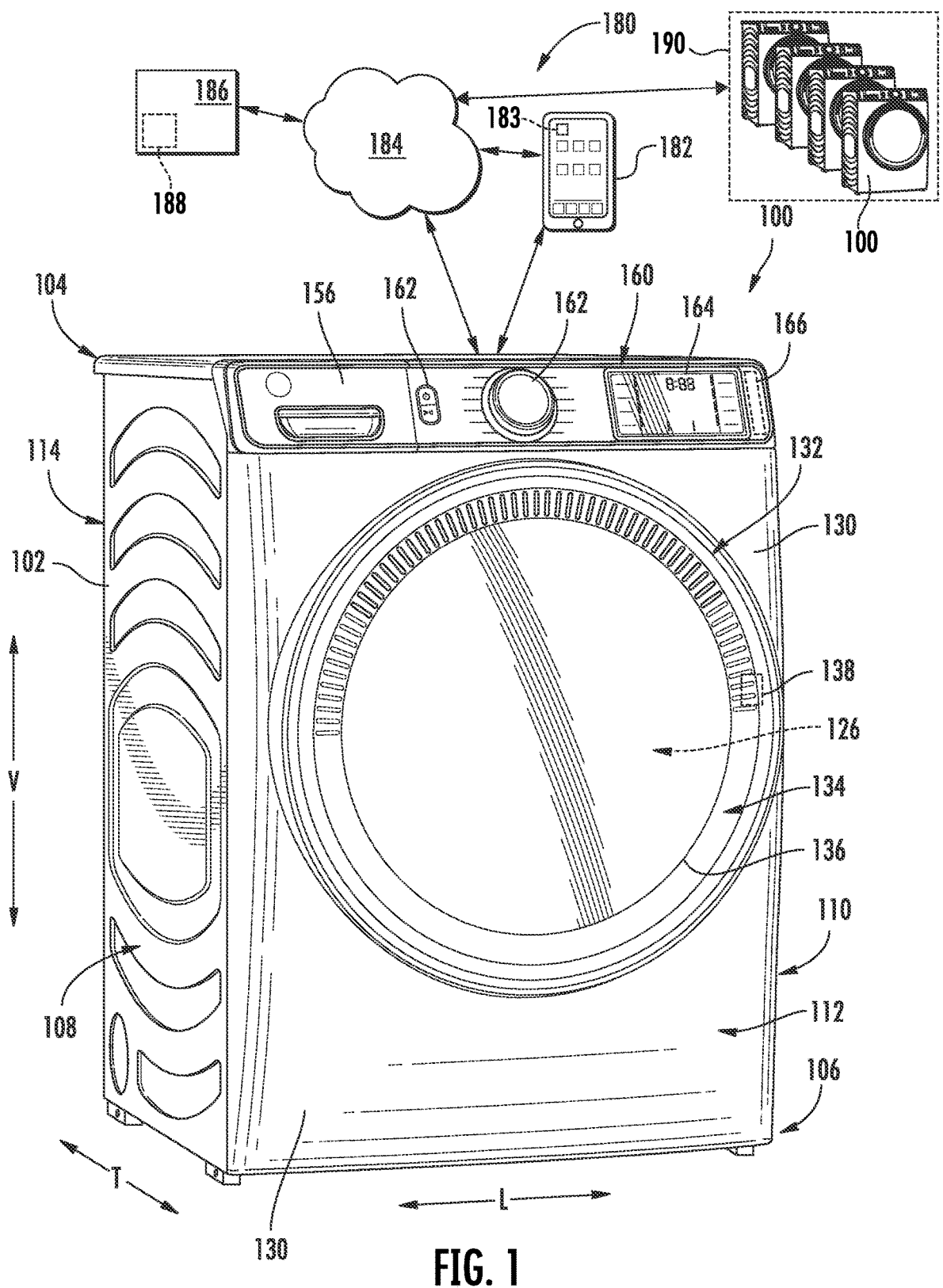
FIG. 1 provides a perspective view of an exemplary laundry appliance according to exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
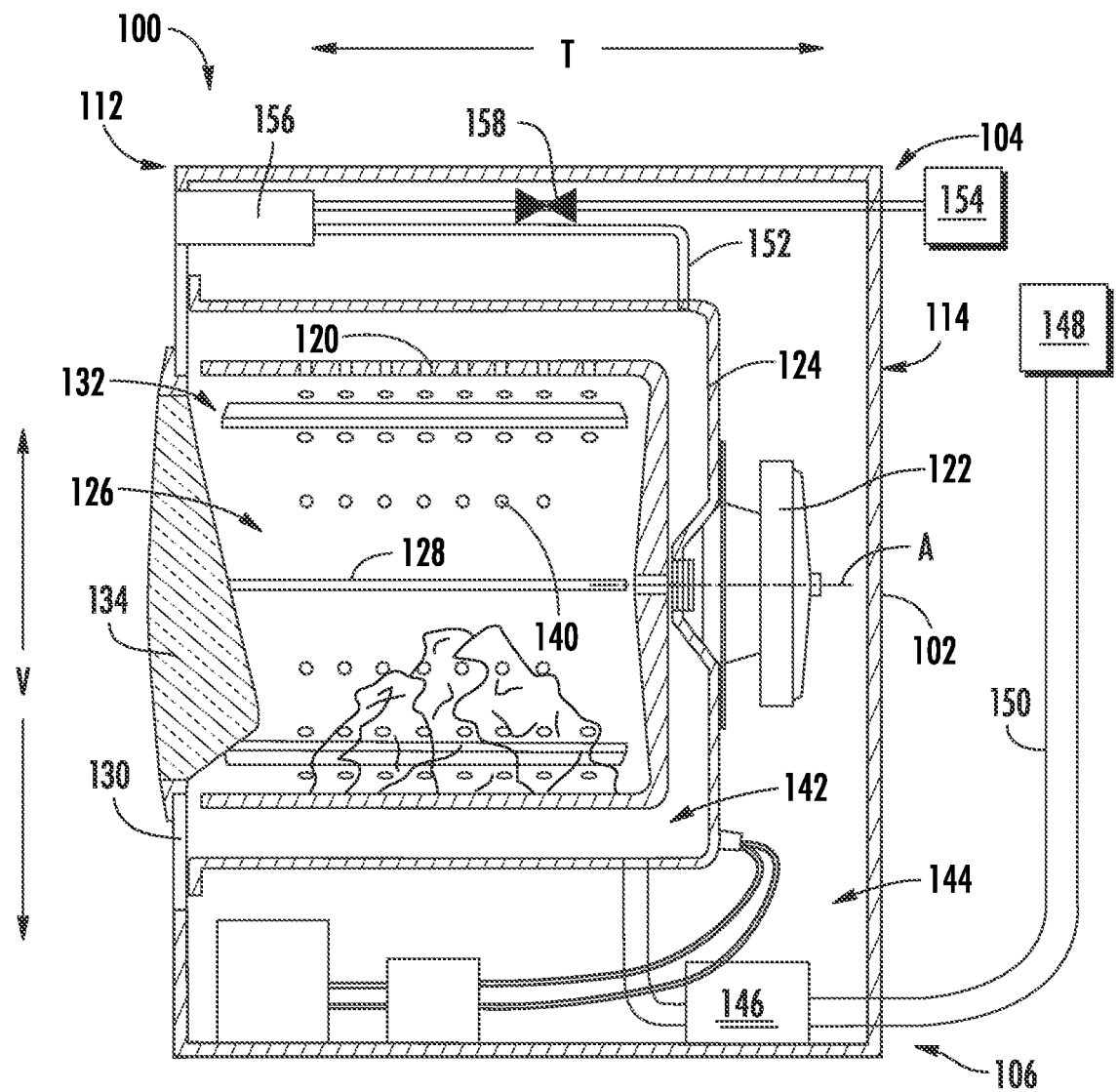
FIG. 2 provides a side cross-sectional view of the exemplary laundry appliance of FIG. 1.

Referring now to the figures, an exemplary laundry appliance that may be used to implement aspects of the present disclosure will be described. Specifically, FIG. 1 is a perspective view of an exemplary laundry appliance provided as a horizontal axis washing machine appliance 100. FIG. 2 is a side cross-sectional view of washing machine appliance 100. As illustrated, washing machine appliance 100 generally defines a vertical direction V, a lateral direction L, and a transverse direction T, each of which is mutually perpendicular, such that an orthogonal coordinate system is generally defined.

According to exemplary embodiments, washing machine appliance 100 includes a cabinet 102 that is generally configured for containing or supporting various components of washing machine appliance 100 and which may also define one or more internal chambers or compartments of washing machine appliance 100. In this regard, as used herein, the terms "cabinet," "housing," and the like are generally intended to refer to an outer frame or support structure for washing machine appliance 100, e.g., including any suitable number, type, and configuration of support structures formed from any suitable materials, such as a system of elongated support members, a plurality of interconnected panels, or some combination thereof. It should be appreciated that cabinet 102 does not necessarily require an enclosure and may simply include open structure supporting various elements of washing machine appliance 100. By contrast, cabinet 102 may enclose some or all portions of an interior of cabinet 102. It should be appreciated that cabinet 102 may have any suitable size, shape, and configuration while remaining within the scope of the present subject matter.

As illustrated, cabinet 102 generally extends between a top 104 and a bottom 106 along the vertical direction V, between a first side 108 (e.g., the left side when viewed from the front as in FIG. 1) and a second side 110 (e.g., the right side when viewed from the front as in FIG. 1) along the lateral direction L, and between a front 112 and a rear 114 along the transverse direction T. In general, terms such as "left," "right," "front," "rear," "top," or "bottom" are used with reference to the perspective of a user accessing washing machine appliance 100.

Referring to FIG. 2, a wash basket 120 is rotatably mounted within cabinet 102 such that it is rotatable about an axis of rotation A. A motor 122, e.g., such as a pancake motor, is in mechanical communication with wash basket 120 to selectively rotate wash basket 120 (e.g., during an agitation or a rinse cycle of washing machine appliance 100). Wash basket 120 is received within a wash tub 124 and defines a laundry or wash chamber 126 that is configured for receipt of articles for laundering (e.g., washing). The wash tub 124 holds wash and rinse fluids for agitation in wash basket 120 within wash tub 124. As used herein, "wash fluid" may refer to water, detergent, fabric softener, bleach, or any other suitable wash additive or combination thereof. Indeed, for simplicity of discussion, these terms may all be used interchangeably herein without limiting the present disclosure to any particular "wash fluid."

Wash basket 120 may define one or more agitator features that extend into wash chamber 126 to assist in agitation and cleaning articles disposed within wash chamber 126 during operation of washing machine appliance 100. For example, as illustrated in FIG. 2, a plurality of ribs 128 extends from basket 120 into wash chamber 126. In this manner, for example, ribs 128 may lift articles disposed in wash basket 120 during rotation of wash basket 120.

Referring generally to FIGS. 1 and 2, cabinet 102 also includes a front panel 130 which defines an opening 132 that permits user access to wash basket 120 of wash tub 124. More specifically, washing machine appliance 100 includes a door 134 that is positioned over opening 132 and is rotatably mounted to front panel 130. In this manner, door 134 permits selective access to opening 132 by being movable between an open position (not shown) facilitating access to a wash tub 124 and a closed position (FIG. 1) prohibiting access to wash tub 124.

A window 136 in door 134 permits viewing of wash basket 120 when door 134 is in the closed position, e.g., during operation of washing machine appliance 100. Door 134 also includes a handle (not shown) that, e.g., a user may pull when opening and closing door 134. Further, although door 134 is illustrated as mounted to front panel 130, it should be appreciated that door 134 may be mounted to another side of cabinet 102 or any other suitable support according to alternative embodiments. Washing machine appliance 100 may further include a latch assembly 138 (see FIG. 1) that is mounted to cabinet 102 or door 134 for selectively locking door 134 in the closed position or confirming that the door is in the closed position. Latch assembly 138 may be desirable, for example, to ensure only secured access to wash chamber 126 or to otherwise ensure and verify that door 134 is closed during certain operating cycles or events.

Referring again to FIG. 2, wash basket 120 also defines a plurality of perforations 140 in order to facilitate fluid communication between an interior of basket 120 and wash tub 124. A sump 142 is defined by wash tub 124 at a bottom of wash tub 124 along the vertical direction V. Thus, sump 142 is configured for receipt of and generally collects wash fluid during operation of washing machine appliance 100. For example, during operation of washing machine appliance 100, wash fluid may be urged by gravity from basket 120 to sump 142 through plurality of perforations 140.

A drain pump assembly 144 is located beneath wash tub 124 and is in fluid communication with sump 142 for periodically discharging soiled wash fluid from washing machine appliance 100. Drain pump assembly 144 may generally include a drain pump 146 which is in fluid communication with sump 142 and with an external drain 148 through a drain hose 150. During a drain cycle, drain pump 146 urges a flow of wash fluid from sump 142, through drain hose 150, and to external drain 148. More specifically, drain pump 146 includes a motor (not shown) which is energized during a drain cycle such that drain pump 146 draws wash fluid from sump 142 and urges it through drain hose 150 to external drain 148.

Washing machine appliance 100 may further include a wash fluid dispenser that is generally configured for dispensing a flow of water, wash fluid, etc. into wash tub 124. For example, a spout 152 is configured for directing a flow of fluid into wash tub 124. For example, spout 152 may be in fluid communication with a water supply 154 (FIG. 2) in order to direct fluid (e.g., clean water or wash fluid) into wash tub 124. Spout 152 may also be in fluid communication with the sump 142. For example, pump assembly 144 may direct wash fluid disposed in sump 142 to spout 152 in order to circulate wash fluid in wash tub 124.

As illustrated in FIG. 2, a detergent drawer 156 is slidably mounted within front panel 130. Detergent drawer 156 receives a wash additive (e.g., detergent, fabric softener, bleach, or any other suitable liquid or powder) and directs the fluid additive to wash tub 124 during operation of washing machine appliance 100. According to the illustrated embodiment, detergent drawer 156 may also be fluidly coupled to spout 152 to facilitate the complete and accurate dispensing of wash additive. It should be appreciated that according to alternative embodiments, these wash additives could be dispensed automatically via a bulk dispensing unit (not shown). Other systems and methods for providing wash additives are possible and within the scope of the present disclosure.

In addition, a water supply valve 158 may provide a flow of water from a water supply source (such as a municipal water supply 154) into detergent dispenser 156 and into wash tub 124. In this manner, water supply valve 158 may generally be operable to supply water into detergent dispenser 156 to generate a wash fluid, e.g., for use in a wash cycle, or a flow of fresh water, e.g., for a rinse cycle. It should be appreciated that water supply valve 158 may be positioned at any other suitable location within cabinet 102. In addition, although water supply valve 158 is described herein as regulating the flow of "wash fluid," it should be appreciated that this term includes, water, detergent, other additives, or some mixture thereof.

During operation of washing machine appliance 100, laundry items are loaded into wash basket 120 through opening 132, and washing operation is initiated through operator manipulation of one or more input selectors or using a remote device (see below). Wash tub 124 is filled with water, detergent, or other fluid additives, e.g., via spout 152 or detergent drawer 156. One or more valves (e.g., water supply valve 158) can be controlled by washing machine appliance 100 to provide for filling wash basket 120 to the appropriate level for the amount of articles being washed or rinsed. By way of example for a wash mode, once wash basket 120 is properly filled with fluid, the contents of wash basket 120 can be agitated (e.g., with ribs 128) for washing of laundry items in wash basket 120.

After the agitation phase of the wash cycle is completed, wash tub 124 can be drained. Laundry articles can then be rinsed by again adding fluid to wash tub 124, depending on the particulars of the cleaning cycle selected by a user. Ribs 128 may again provide agitation within wash basket 120. One or more spin cycles may also be used. In particular, a spin cycle may be applied after the wash cycle or after the rinse cycle in order to wring wash fluid from the articles being washed. During a final spin cycle, basket 120 is rotated at relatively high speeds and drain assembly 144 may discharge wash fluid from sump 142. After articles disposed in wash basket 120 are cleaned, washed, or rinsed, the user can remove the articles from wash basket 120, e.g., by opening door 134 and reaching into wash basket 120 through opening 132.

Referring again to FIG. 1, washing machine appliance 100 may include a control panel 160 that may represent a general-purpose Input/Output ("GPIO") device or functional block for washing machine appliance 100. In some embodiments, control panel 160 may include or be in operative communication with one or more user input devices 162, such as one or more of a variety of digital, analog, electrical, mechanical, or electro-mechanical input devices including rotary dials, control knobs, push buttons, toggle switches, selector switches, and touch pads. Additionally, washing machine appliance 100 may include a display 164, such as a digital or analog display device generally configured to provide visual feedback regarding the operation of washing machine appliance 100. For example, display 164 may be provided on control panel 160 and may include one or more status lights, screens, or visible indicators. According to exemplary embodiments, user input devices 162 and display 164 may be integrated into a single device, e.g., including one or more of a touchscreen interface, a capacitive touch panel, a liquid crystal display (LCD), a plasma display panel (PDP), a cathode ray tube (CRT) display, or other informational or interactive displays.

Washing machine appliance 100 may further include or be in operative communication with a processing device or a controller 166 that may be generally configured to facilitate appliance operation. In this regard, control panel 160, user input devices 162, and display 164 may be in communication with controller 166 such that controller 166 may receive control inputs from user input devices 162, may display information using display 164, and may otherwise regulate operation of washing machine appliance 100. For example, signals generated by controller 166 may operate washing machine appliance 100, including any or all system components, subsystems, or interconnected devices, in response to the position of user input devices 162 and other control commands. Control panel 160 and other components of washing machine appliance 100 may be in communication with controller 166 via, for example, one or more signal lines or shared communication busses. In this manner, Input/Output ("I/O") signals may be routed between controller 166 and various operational components of washing machine appliance 100.

As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 166 may be constructed without using a microprocessor, e.g., using a combination of discrete analog or digital logic circuitry (such as switches, amplifiers, integrators, comparators, flip-flops, OR gates, and the like) to perform control functionality instead of relying upon software.

Controller 166 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor of controller 166 or may be included onboard within such a processor. In addition, these memory devices can store information or data accessible by the one or more processors of controller 166, including instructions that can be executed by the one or more processors. It should be appreciated that the instructions can be software written in any suitable programming language or can be implemented in hardware. Additionally, or alternatively, the instructions can be executed logically or virtually using separate threads on one or more processors.

For example, controller 166 may be operable to execute programming instructions or micro-control code associated with an operating cycle of washing machine appliance 100. In this regard, the instructions may be software or any set of instructions that when executed by the processing device, cause the processing device to perform operations, such as running one or more software applications, displaying a user interface, receiving user input, processing user input, etc. Moreover, it should be noted that controller 166 as disclosed herein is capable of and may be operable to perform one or more methods, method steps, or portions of methods of appliance operation.

The memory devices of controller 166 may also store data that can be retrieved, manipulated, created, or stored by the one or more processors or portions of controller 166. The data can include, for instance, data to facilitate performance of methods described herein. The data can be stored locally (e.g., on controller 166) in one or more databases or may be split up so that the data is stored in multiple locations. In addition, or alternatively, the one or more database(s) can be connected to controller 166 through any suitable network(s), such as through a high bandwidth local area network (LAN) or wide area network (WAN). In this regard, for example, controller 166 may further include a communication module or interface that may be used to communicate with one or more other component(s) of washing machine appliance 100, controller 166, an external appliance controller, or any other suitable device, e.g., via any suitable communication lines or network(s) and using any suitable communication protocol. The communication interface can include any suitable components for interfacing with one or more network(s), including for example, transmitters, receivers, ports, controllers, antennas, or other suitable components.

Referring again to FIG. 1, a schematic diagram of an external communication system 180 will be described according to an exemplary embodiment of the present subject matter. In general, external communication system 180 is configured for permitting interaction, data transfer, and other communications between multiple discrete devices, such as a laundry appliance or more remote user devices. For example, this communication may be used to provide and receive operating parameters, user instructions or notifications, user preferences, or any other suitable information for engagement with washing machine appliance 100. In addition, it should be appreciated that external communication system 180 may be used to transfer data or other information to improve user interaction with laundry appliance or one or more remote user devices.

For example, external communication system 180 may permit controller 166 of washing machine appliance 100 to communicate with a separate device external to washing machine appliance 100, referred to generally herein as a remote user device 182. As described in more detail below, these communications may be facilitated using a wired or wireless connection, such as via a network 184. In general, remote user device 182 may be any suitable device separate from washing machine appliance 100 that is configured to provide or receive communications, information, data, or commands from a user. In this regard, remote user device 182 may be, for example, a personal phone, a smartphone, a tablet, a laptop or personal computer, a wearable device, a smart home system, or another mobile or external device. In some embodiments, remote user device 182 includes a camera or camera module 183. Camera 183 may be any type of device suitable for capturing a two-dimensional picture or image. As an example, camera 183 may be a video camera or a digital camera with an electronic image sensor [e.g., a charge coupled device (CCD) or a CMOS sensor]. When assembled, camera 183 is generally mounted or fixed to a body of remote user device 182 and is in communication (e.g., electric or wireless communication) with a controller of the remote user device 182 such that the controller may receive a signal from camera 183 corresponding to the image captured by camera 183.

Optionally, the remote user device 182 may include or be able to access a software application for interacting with the laundromat appliances. For instance, the remote user device 182 may be provided or associated with a particular user profile to interact with and operate each of the laundromat appliances. Such a profile may include physical or digital wallets that contain credits (e.g., coupons, tokens, or digital currency) for performing one or more cycles of the various washers and dryers within a laundromat.

In addition, a remote server 186 may be in communication with washing machine appliance 100 or remote user device 182 through network 184. In this regard, for example, remote server 186 may be a cloud-based server 186, and is thus located at a distant location, such as in a separate state, country, etc.

Generally remote server 186 may include a controller 188 (e.g., including one or more suitable processing devices, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. Controller 188 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor of controller 188 or may be included onboard within such processor. In addition, these memory devices can store information or data accessible by the one or more processors of the controller 188, including instructions that can be executed by the one or more processors. It should be appreciated that the instructions can be software written in any suitable programming language or can be implemented in hardware. Additionally, or alternatively, the instructions can be executed logically or virtually using separate threads on one or more processors.

For example, controller 188 may be operable to execute programming instructions or micro-control code associated with operation of or engagement with washing machine appliance 100. In this regard, the instructions may be software or any set of instructions that when executed by the processing device, cause the processing device to perform operations, such as running one or more software applications, displaying or directing a user interface, receiving user input, processing user input, etc. Moreover, it should be noted that controller 188 as disclosed herein is capable of and may be operable to perform one or more methods, method steps, or portions of methods of appliance operation. For example, in some embodiments, these methods may be embodied in programming instructions stored in the memory and executed by controller 188.

The memory devices of controller 188 may also store data that can be retrieved, manipulated, created, or stored by the one or more processors or portions of controller 188. The data can include, for instance, data to facilitate performance of methods described herein. As an example, the data may include identifying information to identify or select a discrete laundry appliance (e.g., from a predetermined list or database of multiple different laundry appliances, such as might be provided at one or more associated laundromats 190) based on one or more appliance identifiers (e.g., codes or serial numbers) that may be received from another device. As an additional or alternative example, the data may include a list of the most recent users (e.g., associated user profiles) for a discrete laundry appliance. The list of most recent users may include, for instance, a first (e.g., most recent) prior-user profile and a second (e.g., penultimate or next most recent) prior-user profile. Such a list may be assembled, for instance, based on the time or particular user-profile used to access or unlock the discrete laundry appliance (e.g., as would be understood).

The data can be stored locally (e.g., on controller 188) in one or more databases or may be split up so that the data is stored in multiple locations. In addition, or alternatively, the one or more database(s) can be connected to controller 166 through any suitable network(s), such as through a high bandwidth local area network (LAN) or wide area network (WAN). In this regard, for example, controller 188 may further include a communication module or interface that may be used to communicate with washing machine appliance 100, controller 166, or any other suitable device, e.g., via any suitable communication lines or network(s) and using any suitable communication protocol. The communication interface can include any suitable components for interfacing with one or more network(s), including for example, transmitters, receivers, ports, controllers, antennas, or other suitable components.

According to an exemplary embodiment, remote user device 182 may communicate with a remote server 186 over network 184, such as the Internet, to transmit/receive data or information, provide user inputs, receive user notifications or instructions, interact with or control washing machine appliance 100, etc. In addition, remote user device 182 and remote server 186 may communicate with washing machine appliance 100 to communicate similar information.

In general, communication between washing machine appliance 100, remote user device 182, remote server 186, or other user devices or appliances may be carried using any type of wired or wireless connection and using any suitable type of communication network, non-limiting examples of which are provided below. For example, remote user device 182 may be in direct or indirect communication with washing machine appliance 100 through any suitable wired or wireless communication connections or interfaces, such as network 184. For example, network 184 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), or protection schemes (e.g., VPN, secure HTTP, SSL).

External communication system 180 is described herein according to an exemplary embodiment of the present disclosure. However, it should be appreciated that the exemplary functions and configurations of external communication system 180 provided herein are used only as examples to facilitate description of aspects of the present disclosure. System configurations may vary, other communication devices may be used to communicate directly or indirectly with one or more associated appliances, other communication protocols and steps may be implemented, etc. These variations and modifications are contemplated as within the scope of the present disclosure.

While described in the context of a specific embodiment of horizontal axis washing machine appliance 100, using the teachings disclosed herein it will be understood that horizontal axis washing machine appliance 100 is provided by way of example only. Other laundry appliances having different configurations, different appearances, or different features may also be utilized with the present subject as well. Such laundry appliances may include a vertical axis washing machine appliance, dryer appliance, combined washer/dryer appliance, etc., as would be understood in light of the present disclosure.

Referring still to FIG. 1, washing machine appliance 100 may be utilized as a commercial washer in a laundromat or another commercial setting. In this regard, as used herein, discussion of the use of laundry appliances in a commercial setting may generally refer to the use of the appliance in any location where two or more appliances are provided for use by consumers. These commercial settings are commonly laundromats that include a large number of washers and dryers that are configured for pay-per-use operation, e.g., via cash, coins, digital currency, or other forms of payment.

For example, as shown in FIG. 1, washing machine appliance 100 may be located in a laundromat (e.g., as identified generally by reference numeral 190) along with other washing machine appliances, dryer appliances, etc. In some embodiments, each of the laundry appliances (e.g., washers or dryers) includes an appliance identifier or designation to identify a particular laundry appliance at a remote user device 182 or remote server 186. Such an identifier may be embedded or stored (e.g., within a corresponding controller 166). Additionally or alternatively, the appliance identifier may be encoded in a bar code, such as a QR code applied or fixed to a portion of the appliance (e.g., on the corresponding cabinet or control panel). Further additionally or alternatively, the appliance identifier may include a serial number of the washing machine appliance, e.g., which may be recognized in a captured two-dimensional image of the laundry appliance by the remote user device. Thus, unlocking or identifying a particular laundry appliance may include scanning a code on the laundry appliance or taking a picture of the laundry appliance, such as a picture of a nameplate on the laundry appliance.

Figure 3A:
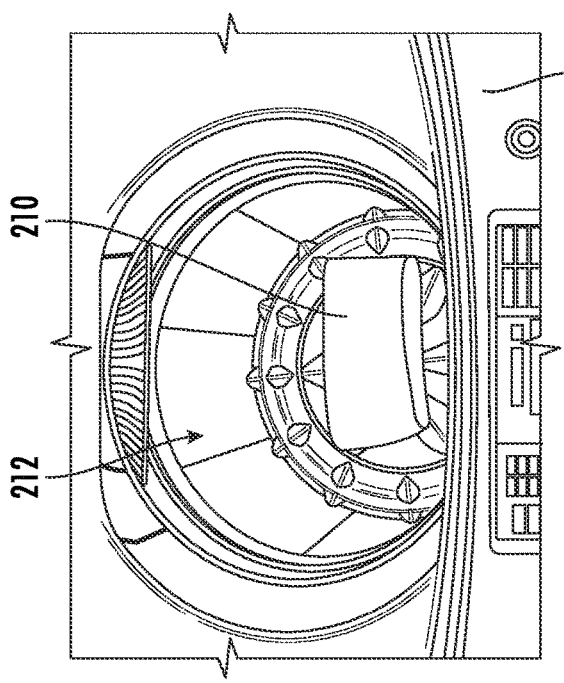
FIGS. 3A, 3B, and 3C provide exemplary two dimensional images capturing an article within a laundry chamber of a laundry appliance, according to exemplary embodiments of the present disclosure.
Figure 3B:
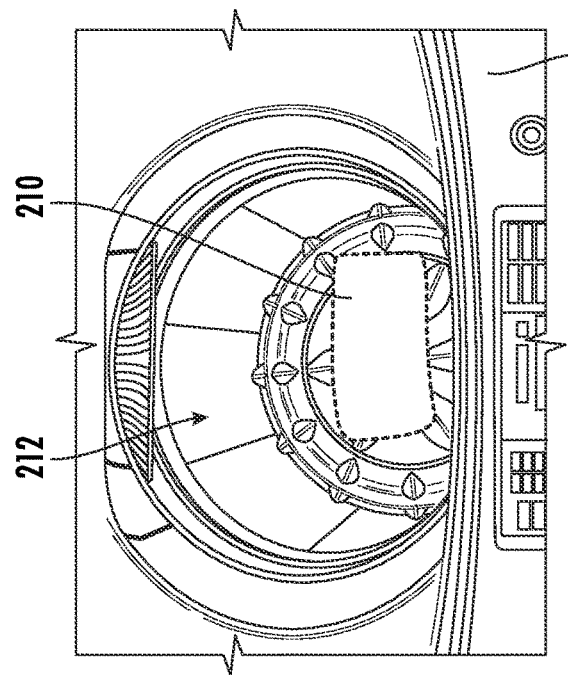
Figure 3C:
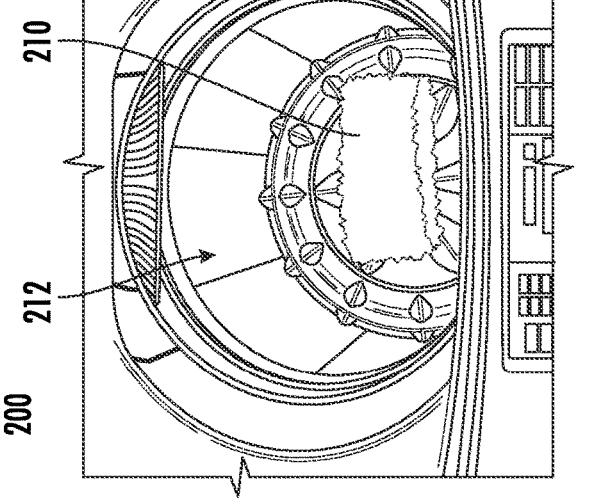
Figure 4:
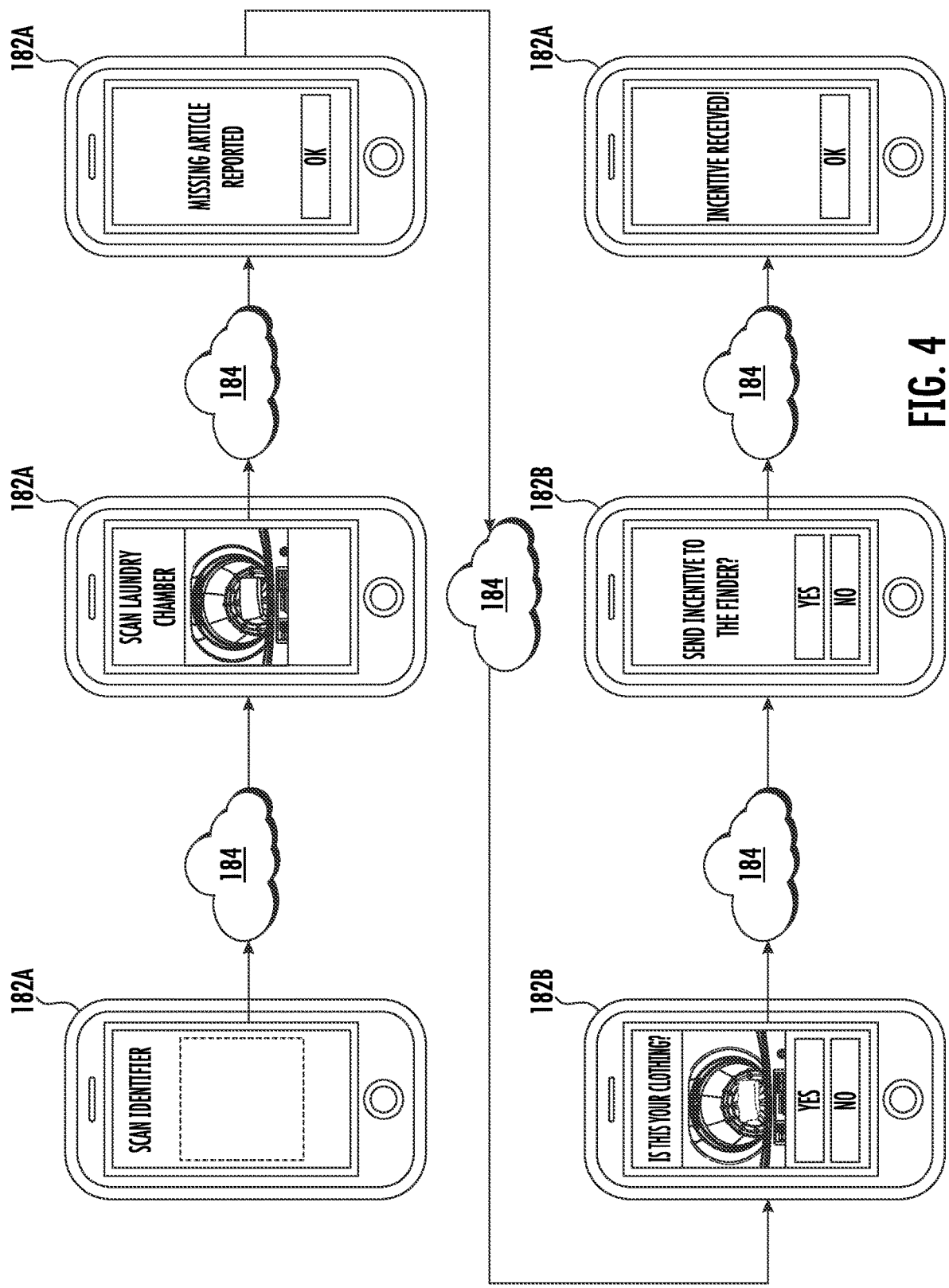
FIG. 4 illustrates communication between two remote user devices for operation of a laundry in accordance with exemplary embodiments of the present disclosure.

Turning now to FIGS. 3 and 4, now that the construction of an exemplary laundry appliance (e.g., washing machine appliance 100), remote user device 182, and remote server 186 have all been presented, exemplary engagement with a laundry appliance 200 (e.g., washing machine appliance 100—FIG. 1) can be described below. Such engagement may arise, for instance, when a contemporary user discovers an article (e.g., laundry article 210) within a laundry chamber 212 (e.g., wash chamber, such as 126—FIG. 2—or, alternatively, dryer chamber) of a particular or discrete laundry appliance 200 (e.g., a specific washing machine appliance or dryer appliance unit of a plurality of known or predetermined laundry appliance units) that the contemporary user intended to use. The contemporary user may identify the particular laundry appliance 200, such as by scanning a bar code (e.g., QR code), serial number, nameplate, etc., or inputting another appliance identifier, through a contemporary user remote device 182A, into a software application (i.e., "app") or website. The appliance identifier may then be transmitted (e.g., via the network) to a remote server 186 (e.g., remote server 186—FIG. 1), which may be configured to identify the discrete laundry appliance 200. Following identification of the discrete laundry appliance 200, the contemporary user may capture a two-dimensional image (e.g., FIG. 3A) of the laundry chamber 212, including the laundry article 210, to report the missing article. The remote server 186 may notify the contemporary user or contemporary user profile that the missing article has been reported.

At the remote server 186 or the remote user device 182, the captured two-dimensional image may be analyzed (e.g., to identify the presence or definition of the laundry article 210). Specifically, the analysis of the captured may include implementation an image processing algorithm isolating the laundry article 210 (FIG. 3B). For instance, the image processing algorithms may use suitable techniques for recognizing or identifying items or objects, such as edge matching or detection, divide-and-conquer searching, grey-scale matching, histograms of receptive field responses, or another suitable routine (e.g., executed at the controller 188 of the remote server 186 based on one or more captured images from one or more cameras). Other image processing techniques are possible and within the scope of the present subject matter. The processing algorithm may further include measures for isolating or eliminating noise in the image comparison, e.g., due to image resolution, data transmission errors, inconsistent lighting, or other imaging errors. By eliminating such noise, the image processing algorithms may improve accurate object detection, avoid erroneous object detection, and isolate the important object, region, or pattern within an image.

In addition to the image processing techniques described above, the image analysis may include utilizing artificial intelligence ("AI"), such as a machine learning image recognition process, a neural network classification module, any other suitable artificial intelligence (AI) technique, or any other suitable image analysis techniques, examples of which will be described in more detail below. Moreover, each of the exemplary image analysis or evaluation processes described below may be used independently, collectively, or interchangeably to extract detailed information regarding the images being analyzed to facilitate performance of one or more methods described herein or to otherwise improve appliance operation. According to exemplary embodiments, any suitable number and combination of image processing, image recognition, or other image analysis techniques may be used to obtain an accurate analysis of the obtained images.

In this regard, the image recognition process may use any suitable artificial intelligence technique, for example, any suitable machine learning technique, or for example, any suitable deep learning technique. According to an exemplary embodiment, the image recognition process may include the implementation of a form of image recognition called region based convolutional neural network ("R-CNN") image recognition. Generally speaking, R-CNN may include taking an input image and extracting region proposals that include a potential object or region of an image. In this regard, a "region proposal" may be one or more regions in an image that could belong to a particular object or may include adjacent regions that share common pixel characteristics. A convolutional neural network is then used to compute features from the region proposals and the extracted features will then be used to determine a classification for each particular region.

According to still other embodiments, an image segmentation process may be used along with the R-CNN image recognition. In general, image segmentation creates a pixel-based mask for each object in an image and provides a more detailed or granular understanding of the various objects within a given image. In this regard, instead of processing an entire image—i.e., a large collection of pixels, many of which might not contain useful information—image segmentation may involve dividing an image into segments (e.g., into groups of pixels containing similar attributes) that may be analyzed independently or in parallel to obtain a more detailed representation of the object or objects in an image. This may be referred to herein as "mask R-CNN" and the like, as opposed to a regular R-CNN architecture. For example, mask R-CNN may be based on fast R-CNN which is slightly different than R-CNN. For example, R-CNN first applies a convolutional neural network ("CNN") and then allocates it to zone recommendations on the covn5 property map instead of the initially split into zone recommendations. In addition, according to exemplary embodiments, standard CNN may be used to obtain, identify, or detect any other qualitative or quantitative data related to one or more objects or regions within the one or more images. In addition, a K-means algorithm may be used.

According to still other embodiments, the image recognition process may use any other suitable neural network process while remaining within the scope of the present subject matter. For example, the step of analyzing the one or more images may include using a deep belief network ("DBN") image recognition process. A DBN image recognition process may generally include stacking many individual unsupervised networks that use each network's hidden layer as the input for the next layer. According to still other embodiments, the step of analyzing one or more images may include the implementation of a deep neural network ("DNN") image recognition process, which generally includes the use of a neural network (computing systems inspired by the biological neural networks) with multiple layers between input and output. Other suitable image recognition processes, neural network processes, artificial intelligence analysis techniques, and combinations of the above described or other known methods may be used while remaining within the scope of the present subject matter.

In addition, it should be appreciated that various transfer techniques may be used but use of such techniques is not required. If using transfer techniques learning, a neural network architecture may be pretrained such as VGG16/VGG19/ResNet50 with a public dataset then the last layer may be retrained with an appliance specific dataset. In addition, or alternatively, the image recognition process may include detection of certain conditions based on comparison of initial conditions, may rely on image subtraction techniques, image stacking techniques, image concatenation, etc. For example, the subtracted image may be used to train a neural network with multiple classes for future comparison and image classification.

It should be appreciated that the machine learning image recognition models may be actively trained by the appliance with new images, may be supplied with training data from the manufacturer or from another remote source, or may be trained in any other suitable manner. For example, according to exemplary embodiments, this image recognition process relies at least in part on a neural network trained with a plurality of images of the appliance in different configurations, experiencing different conditions, or being interacted with in different manners. This training data may be stored locally or remotely and may be communicated to a remote server for training other appliances and models.

It should be appreciated that the image processing algorithms and machine learning image recognition processes described herein are only exemplary and are not intended to limit the scope of the present subject matter in any manner.

Once the laundry article 210 is identified, the two-dimensional image may be modified. In particular, the image may be modified to obfuscate the representation of the laundry article 210 within laundry chamber 212 (FIG. 3C). For instance, further image processing may apply a filter or alter the pixels at the region of the image that includes the identified laundry article 210, as would be understood. Such processing may include use techniques or algorithms to blur the laundry article 210, such as would be provided by a Gaussian filter, median filter, bilateral filter, etc.

Following identification or modification of the two-dimensional image, the remote server 186 may select a prior user or prior-user profile (e.g., corresponding to the most recent user of the discrete laundry appliance 200 prior to the contemporary user). Moreover, the remote server 186 may transmit a signal to initiate a found-article message to the prior-user profile (e.g., to be displayed at a prior-user remote device 182B). In turn, the prior user may confirm or deny ownership of the laundry article 210, such as within the app on the prior-user remote device 182B. As an example, an ownership-confirmation signal may be transmitted to the remote server 186.

If the laundry article 210 is confirmed as belonging to a prior user, the prior user may be given the option to gift the contemporary user a reward or incentive. For example, an incentive may be directed by the remote server 186 in response to a reward signal transmitted from the prior-user profile. According to exemplary embodiments, the incentive may include at least one of a free or discounted wash cycle, a free or discounted dryer cycle in an associated dryer appliance within laundromat 190, or other cycle credits. For example, the contemporary profile may be credited with one or more tokens that may be applied to pay for future operating cycles of the appliances within laundromat 190.

Figure 5:
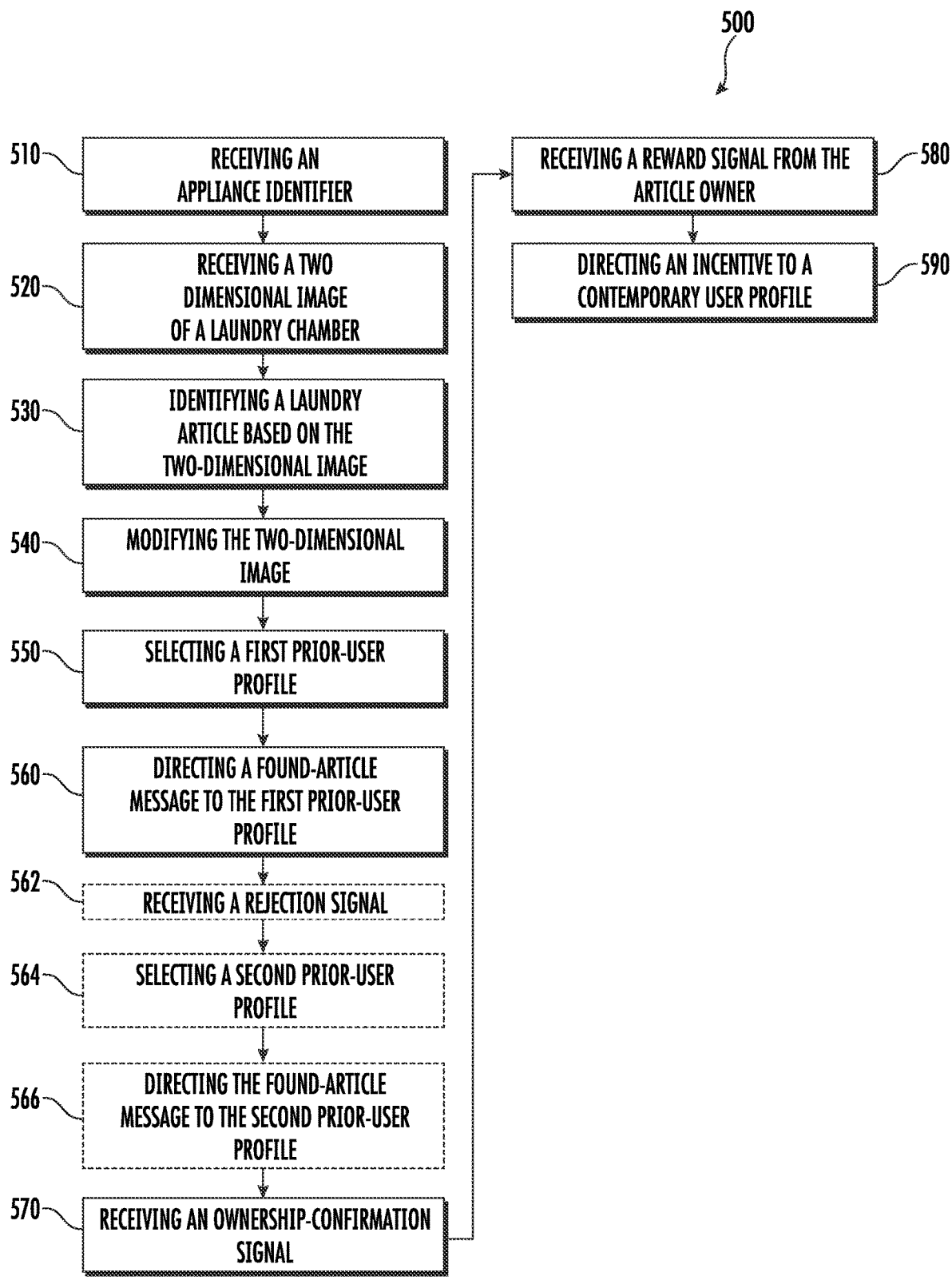
FIG. 5 provides a flow chart illustrating a method of operating a laundry appliance according to exemplary embodiments of the present disclosure.

Turning now to FIG. 5, flow chart is provided of a method 500 according to exemplary embodiments of the present disclosure. Generally, the method 500 provides a method of operating or engaging with a discrete laundry appliance 200 (e.g., washing machine appliance 100—FIG. 1, dryer appliance, or combined washer/dryer appliance) from a plurality of laundry appliances (e.g., within a laundromat 190—FIG. 1). The method 500 can be performed, for instance, by the controller 188 (FIG. 1) of a remote server 186 in communication with one or more remote devices 182.

Advantageously, methods in accordance with the present disclosure may permit efficient or secure return of one or more missing articles within a laundry appliance.

FIG. 5 depicts steps performed in a particular order for purpose of illustration and discussion. Those of ordinary skill in the art, using the disclosures provided herein, will understand that the steps of any of the methods disclosed herein can be modified, adapted, rearranged, omitted, or expanded in various ways without deviating from the scope of the present disclosure (except as otherwise described).

At 510, the method 500 includes receiving an appliance identifier that corresponds to a particular or discrete laundry appliance (e.g., from a plurality of laundry appliances). Such a reception may be initiated, for instance, by a contemporary user of the laundry appliance—the contemporary user having a contemporary user profile. For instance, contemporary user scan a bar code (e.g., QR code), serial number, nameplate, etc. (e.g., using the camera of the contemporary user remote device), or manually input the appliance identifier. The appliance identifier may be transmitted, in some embodiments, via a software application (i.e., "app") or website on the contemporary user remote device.

At 520, the method 500 includes receiving a two-dimensional image of a laundry chamber (e.g., following 510). Such a reception may be initiated, for instance, by a contemporary user of the laundry appliance. For instance, the contemporary user may use a camera to capture the two-dimensional image. Once captured, the contemporary user may further prompt the two-dimensional image to be transmitted (e.g., to the remote server). The camera used to capture the two-dimensional image may be the camera module of the contemporary user remote device (e.g., as described above). Thus, the two-dimensional image may be received from a remote user device corresponding to the contemporary user profile.

At 530, the method 500 includes identifying a laundry article based on the two-dimensional image. In particular, the two-dimensional image may be analyzed (e.g., on the remote server or the contemporary user remote device), such as by using one or more image processing routines, techniques, or algorithms (e.g., as described above). In other words, from the two-dimensional image received at 520, it may be recognized that the laundry article is represented in the image and, thus, the laundry article remains in the laundry chamber prior to the contemporary user initiating a wash or dry cycle at the laundry appliance.

At 540, the method 500 includes modifying the two-dimensional image. Specifically, the modification may include obscuring the identified laundry article (i.e., the representation of the laundry article) within the two-dimensional image. For instance, as discussed above, further image processing may apply a filter or alter the pixels at the region of the image that includes the identified laundry article. In turn, the laundry article may be blurred or at least partially covered within the modified two-dimensional image. Notably, users' privacy may be maintained and the two-dimensional may discreetly help show the laundry article without fully revealing any items that may be of a sensitive nature.

At 550, the method 500 includes selecting a first prior-user profile. For instance, a list of the last user—or last several users—to engage with or use the laundry appliance may be used for the selection. Such users may be tracked, for instance, based on their corresponding user profiles (e.g., used to unlock or pay for use of the laundry appliance). Optionally, the list may be ordered chronologically (e.g., in reverse chronological order). Additionally or alternatively, the list may be limited by a predetermined number of slots (e.g., one, two, or three), each slot being occupied by a separate prior-user profile. The list may prioritize more recent prior-user profiles. Thus, the list may be maintained as a rolling or regularly updated list that adds a new prior-user profile and removes an old prior-user profile with each new user or initiated cycle of the laundry appliance. The first prior-user profile may correspond to a first prior user that used (e.g., initiated a wash or dry cycle at) the laundry appliance. For instance, the first prior user may be the most recent user of the laundry appliance prior to the contemporary user. As a result, 550 may include determining a most recent prior user of the laundry appliance and selecting the prior user profile that corresponds to the most recent prior user.

At 560, the method 500 includes directing a found-article message to the first prior-user profile (e.g., following or in response to 550). Generally, the found-article message may include one or more portions of text, images, or sound to indicate that the laundry article has been discovered in the laundry chamber of the laundry appliance. Optionally, the found-article message may include the modified two-dimensional image. Thus, 560 may include transmitting the modified two-dimensional image to the first prior-user profile.

The found-article message may be displayed at the remote device of the first prior user or prior-user profile. Thus, the first prior user may notified that the laundry article has been discovered in the laundry appliance, which has been recently used by the first prior user. In some embodiments, the found-article message includes an engageable icon or response prompt (e.g., as would generally be understood) for the first prior user to confirm or reject ownership of the laundry article. Additionally or alternatively, the found-article message may include an engageable icon or response prompt to gift the contemporary user with a reward or incentive.

At 562, the method 500 includes optionally receiving a rejection signal (e.g., from the first prior-user profile). Thus, the user to which the found-article message is sent may indicate non-ownership of the identified laundry article, such as by engaging a corresponding icon or responding accordingly at the first prior-user remote device.

At 564, the method 500 includes optionally selecting a second prior-user profile corresponding to a second prior user (e.g., in response to 562). The second prior-user profile may correspond to a second prior user that used (e.g., initiated a wash or dry cycle at) the laundry appliance. The second prior user or prior-user profile may predate the first prior user or prior-user profile. For instance, the second prior-user profile may be listed or ordered below (e.g., immediately below) the first prior-user profile. In turn, the second prior user may be the penultimate or next most recent user of the laundry appliance prior to the first prior user and contemporary user. As a result, 564 may include determining a next most recent prior user of the laundry appliance and selecting the prior user profile that corresponds to the next most recent prior user.

At 566, the method 500 includes directing the found-article message to the second prior-user profile (e.g., following or in response to 564). Thus, if a first prior user indicates non-ownership of the laundry article, the found-article message may be sent to the second user so that the second user may confirm or reject ownership of the laundry article.

As would be understood in light of the present disclosure, in the event that a second prior user indicates non-ownership of the laundry article, further (e.g., even earlier or less recent) prior users may be selected and sent the found-article message. Additionally or alternatively, if no prior user is able to indicate ownership (e.g., all prior users included in the list indicate non-ownership), an unclaimed-article message may be transmitted to the contemporary user or contemporary user profile to indicate that the laundry article is unclaimed or that no owner for such the laundry article has been determined.

At 570, the method 500 includes receiving an ownership-confirmation signal (e.g., from the first or second prior-user profile). Generally, 570 may follow 560 or 566. Thus, a user to which the found-article message is sent may indicate ownership of the identified laundry article, such as by engaging a corresponding icon or responding accordingly (e.g., at the first prior-user remote device or the second prior-user remote device).

At 580, the method 500 includes receiving a reward signal from the article owner (e.g., the user corresponding to the ownership-confirmation signal). Such a signal may follow 570. Moreover, the reward signal may be elicited from an engageable icon or response prompt included with the found-article message or, alternatively, transmitted (e.g., from the remote server) in response to 570. According to exemplary embodiments, the incentive may include at least one of a free or discounted wash cycle, a free or discounted dryer cycle in an associated dryer appliance within a laundromat, or other cycle credits. For example, the contemporary profile may be credited with one or more tokens that may be applied to pay for future operating cycles of the appliances within the laundromat.

At 590, the method 500 includes directing an incentive to a contemporary user profile. In other words, the incentive gifted by the owner of the laundry article may be transmitted to an account or wallet that belongs or otherwise corresponds to the contemporary user who found the laundry article.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a laundry appliance defining a laundry chamber for the receipt of articles therein, the method comprising:
receiving a two-dimensional image of the laundry chamber;
identifying a laundry article based on the received two-dimensional image;
selecting a prior-user profile corresponding to the laundry appliance in response to identifying the laundry article; and
directing a found-article message to the prior-user profile following selecting the prior-user profile,
wherein the prior-user profile is a first prior-user profile selected from a chronologically ordered list of past user profiles having engaged with the laundry appliance prior to receiving the two-dimensional image, and
wherein selecting the prior-user profile comprises determining the first prior-user profile as a most recent prior user profile in response to identifying the laundry article.

2. The method of claim 1, wherein the receiving the two-dimensional image is initiated by a contemporary user of the laundry appliance, the contemporary user having a contemporary user profile.

3. The method of claim 2, wherein the two-dimensional image is received from a remote user device corresponding to the contemporary user profile.

4. The method of claim 2, further comprising:
receiving an ownership-confirmation signal from the prior-user profile to indicate ownership of the identified laundry article following directing the found-article message.

5. The method of claim 4, further comprising:
receiving a reward signal from the prior-user profile following receiving the ownership-confirmation signal; and
directing an incentive to the contemporary user profile in response to receiving the reward signal.

6. The method of claim 5, wherein the incentive comprises at least one of a free or discounted wash cycle, a free or discounted dry cycle, or cycle credits.

7. The method of claim 1, further comprising:
modifying the two-dimensional image, modifying comprising obscuring the identified laundry article within the two-dimensional image,
wherein directing the found-article message comprises transmitting the modified two-dimensional image to the prior-user profile.

8. The method of claim 1, further comprising:
receiving an appliance identifier prior to receiving the two-dimensional image.

9. The method of claim 1, further comprising:
receiving a rejection signal from the prior-user profile to indicate non-ownership of the identified laundry article following directing the found-article message.

10. The method of claim 9, wherein the method further comprises:
selecting a second prior-user profile corresponding to the laundry appliance and in response to receiving the rejection signal; and
directing the found-article message to the second prior-user profile following selecting the second prior-user profile.

11. The method of claim 10, wherein the second prior-user profile predates the first prior-user profile in association with the laundry appliance.

12. A method of operating a laundry appliance defining a laundry chamber for the receipt of articles therein, the method comprising:
receiving a two-dimensional image of the laundry chamber, receiving the two-dimensional image being initiated by a contemporary user of the laundry appliance, the contemporary user having a contemporary user profile;
identifying a laundry article based on the received two-dimensional image;
modifying the two-dimensional image such that the identified laundry article is obscured within the two-dimensional image;
selecting a prior-user profile corresponding to the laundry appliance in response to identifying the laundry article; and
directing a found-article message with the modified two-dimensional image to the prior-user profile following selecting the prior-user profile,
wherein the prior-user profile is a first prior-user profile selected from a chronologically ordered list of past user profiles having engaged with the laundry appliance prior to receiving the two-dimensional image, and
wherein selecting the prior-user profile comprises determining the first prior-user profile as a most recent prior user profile in response to identifying the laundry article.

13. The method of claim 12, wherein the two-dimensional image is received from a remote user device corresponding to the contemporary user profile.

14. The method of claim 12, further comprising:
receiving an ownership-confirmation signal from the prior-user profile to indicate ownership of the identified laundry article following directing the found-article message.

15. The method of claim 14, further comprising:
receiving a reward signal from the prior-user profile following receiving the ownership-confirmation signal; and
directing an incentive to the contemporary user profile in response to receiving the reward signal.

16. The method of claim 15, wherein the incentive comprises at least one of a free or discounted wash cycle, a free or discounted dry cycle, or cycle credits.

17. The method of claim 12, further comprising:
receiving an appliance identifier prior to receiving the two-dimensional image.

18. The method of claim 12, further comprising:
receiving a rejection signal from the prior-user profile to indicate non-ownership of the identified laundry article following directing the found-article message.

19. The method of claim 18, wherein the method further comprises:
selecting a second prior-user profile corresponding to the laundry appliance and in response to receiving the rejection signal; and
directing the found-article message to the second prior-user profile following selecting the second prior-user profile.

20. The method of claim 19, wherein the second prior-user profile predates the first prior-user profile in association with the laundry appliance.

* * * * *